US012339608B2

(12) United States Patent
Koizumi (10) Patent No.: US 12,339,608 B2
(45) Date of Patent: Jun. 24, 2025

(54) IMAGE FORMING SYSTEM FOR INSPECTING QUALITY OF IMAGE FORMED ON SHEET AND GENERATES CORRECTION DATA TO CORRECT SECOND IMAGE USING THE CORRECTION DATA

(71) Applicant: CANON KABUSHIKI KAISHA, Tokyo (JP)

(72) Inventor: Kazuhisa Koizumi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 17/959,401

(22) Filed: Oct. 4, 2022

(65) Prior Publication Data
US 2023/0112594 A1   Apr. 13, 2023

(30) Foreign Application Priority Data

Oct. 11, 2021   (JP) .................................. 2021-166916
Aug. 12, 2022   (JP) .................................. 2022-129003

(51) Int. Cl.
*G03G 15/00*   (2006.01)
*B41J 29/393*   (2006.01)
*G06T 7/00*   (2017.01)
*H04N 1/00*   (2006.01)

(52) U.S. Cl.
CPC ........ *G03G 15/5041* (2013.01); *B41J 29/393* (2013.01); *G06T 7/001* (2013.01); *B41J 2203/01* (2020.08); *G03G 2215/00569* (2013.01); *G03G 2215/047* (2013.01); *G06T 2207/30144* (2013.01); *H04N 1/00135* (2013.01)

(58) Field of Classification Search
None
See application file for complete search history.

(56) References Cited

U.S. PATENT DOCUMENTS

| | | | |
|---|---|---|---|
| 11,158,042 B2* | 10/2021 | Huang | G06T 7/001 |
| 2014/0270396 A1* | 9/2014 | Miyagawa | H04N 1/00477 382/112 |
| 2016/0234398 A1* | 8/2016 | Itou | H04N 1/0432 |
| 2018/0131840 A1* | 5/2018 | Honma | H04N 1/6041 |
| 2021/0073966 A1 | 3/2021 | Katsunori et al. | |
| 2021/0203804 A1* | 7/2021 | Seki | H04N 1/00779 |

FOREIGN PATENT DOCUMENTS

| | | |
|---|---|---|
| JP | H09-330412 A | 12/1997 |
| JP | 2005-223515 A | 8/2005 |

* cited by examiner

*Primary Examiner* — Haris Sabah
(74) *Attorney, Agent, or Firm* — Venable LLP (57) ABSTRACT

An image forming system generates second image data representing a result of a reading unit reading an image on a sheet, corrects the second image data using correction data, the correction data being data obtained on the basis of image data obtained by the reading unit reading a predetermined image formed on the sheet by an image forming unit and image data corresponding to the predetermined image, and inspects, on the basis of the corrected second image data and a first image data, an image formed on the sheet on the basis of the first image data.

8 Claims, 7 Drawing Sheets

| PROFILE NUMBER | UPSTREAM APPARATUS i | UPSTREAM APPARATUS ii | DOWNSTREAM APPARATUS i | DOWNSTREAM APPARATUS ii |
|---|---|---|---|---|
| PF1 | PRINTER A | NONE | POST-PROCESSING APPARATUS | NONE |

FIG. 8B

| PROFILE NUMBER | UPSTREAM APPARATUS i | UPSTREAM APPARATUS ii | DOWNSTREAM APPARATUS i | DOWNSTREAM APPARATUS ii |
|---|---|---|---|---|
| PF1 | PRINTER A | NONE | POST-PROCESSING APPARATUS | NONE |
| PF2 | PRINTER A | NONE | STACKER | POST-PROCESSING APPARATUS |

IMAGE FORMING SYSTEM FOR INSPECTING QUALITY OF IMAGE FORMED ON SHEET AND GENERATES CORRECTION DATA TO CORRECT SECOND IMAGE USING THE CORRECTION DATA

BACKGROUND OF THE INVENTION

Field of the Invention

The present invention relates to an image forming system for inspecting the quality of an image formed on a sheet.

Description of the Related Art

A known system uses an inspection apparatus connected to an image forming apparatus for forming an image on a sheet to read an image on a sheet conveyed from the image forming apparatus and inspect the image on the sheet on the basis of the read image. In US-2021-0073966, a RIP image and an image obtained by reading an image formed on a sheet on the basis of the RIP image are compared and the quality (print quality) of the image formed on the sheet is inspected. RIP is an acronym for raster image processing.

A system for reading an image on a conveyed sheet includes a first conveyance unit that conveys a sheet when an image on the sheet is being read and a second conveyance unit that passes the sheet to the first conveyance unit. In a case in which a motor that drives the first conveyance unit is a motor different from a motor that drives the second conveyance unit, the speed at which the sheet is conveyed during image reading may vary. In other words, when the conveyance speed of the sheet varies while the image is being read by an inspection apparatus, the image (image for reading) representing the reading result may be elongated or shortened in the direction corresponding to the conveyance direction of the sheet. When print quality is inspected on the basis of a comparison between such an image for reading and a RIP image, the inspection accuracy may be decreased.

SUMMARY OF THE INVENTION

The present disclosure provides an image forming system comprising: an image forming unit configured to form an image corresponding to first image data input into the image forming system on a sheet; a first conveyance unit configured to convey the sheet conveyed from the image forming unit; a first motor configured to drive the first conveyance unit; a second conveyance unit configured to convey the sheet conveyed from the first conveyance unit; a second motor configured to drive the second conveyance unit; a reading unit configured to read an image on the sheet being conveyed by the second conveyance unit; and one or more processors configured to: generate second image data representing a result of the reading unit reading an image on the sheet; correct the second image data using correction data, the correction data being data obtained on the basis of image data obtained by the reading unit reading a predetermined image formed on the sheet by the image forming unit and image data corresponding to the predetermined image; and inspect, on the basis of the corrected second image data and the first image data, an image formed on the sheet on the basis of the first image data.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Image Forming System

Figure 1:
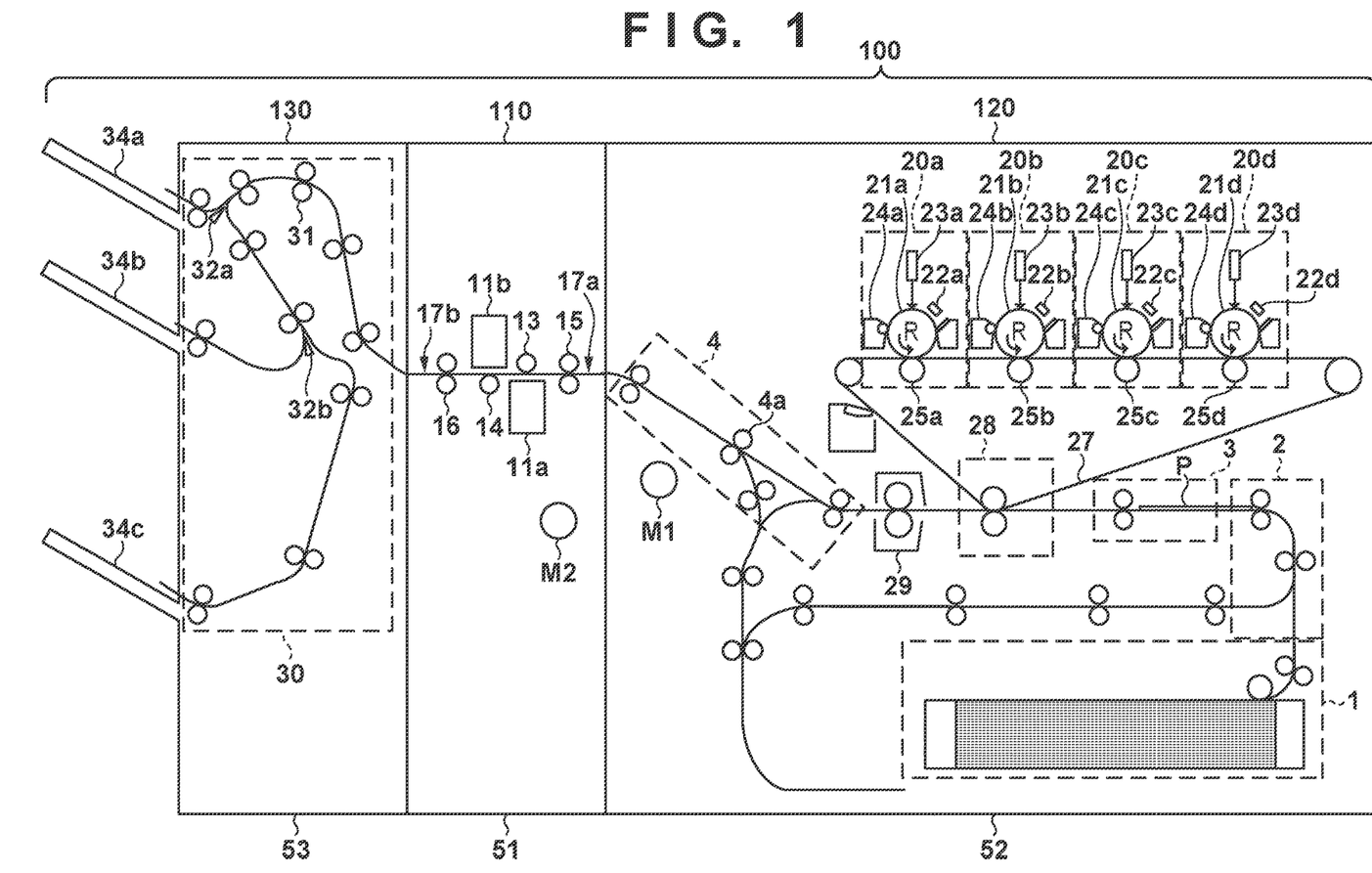
FIG. 1 is a diagram for describing an image forming system.

As illustrated in FIG. 1, an image forming system 100 includes an image inspection apparatus 110 and a sheet conveying apparatus (an image forming apparatus 120 and a post-processing apparatus 130). In the conveyance direction of a sheet P, the image forming apparatus 120 is connected to the upstream side of the image inspection apparatus 110, and the post-processing apparatus 130 is connected to the downstream side of the image inspection apparatus 110. In other words, a housing 52 of the image forming apparatus 120 and a housing 53 of the post-processing apparatus 130 are different from a housing 51 of the image inspection apparatus 110.

The image forming apparatus 120 forms an image on the sheet P via electrophotography. Note that the image forming apparatus 120 may form an image using another image forming method such as the inkjet method or the like.

Image forming units 20a, 20b, 20c, and 20d form yellow Y, magenta M, cyan C, and black K toner images, respective. Hereinafter, a plurality of components that are the same or similar are given the same reference numeral or sign. When distinguishing between the plurality of components, a letter of the alphabet is added to the end of the reference numeral or sign. When describing common items relating to a plurality of components, the letter of the alphabet is not added to the end of the reference numeral or sign.

A photosensitive drum 21 is an image carrier that carries an electrostatic latent image or a toner image. A charging device 22 charges the surface of the photosensitive drum 21. An exposure device 23 forms an electrostatic latent image by irradiating the surface of the photosensitive drum 21 with a laser beam corresponding to an image signal. A developing device 24 develops the electrostatic latent image using the toner to form a toner image. A primary transfer roller 25 transfers the toner image from the photosensitive drum 21 to an intermediate transfer belt 27. The intermediate transfer belt 27 conveys the toner image to a secondary transfer device 28.

A feeding apparatus 1 feeds the sheet P held in the sheet housing case to the conveyance path. A conveying apparatus 2 conveys the sheet P to a registration apparatus 3. The registration apparatus 3 corrects skew in the sheet P and conveys the sheet P to the secondary transfer device 28.

The secondary transfer device 28 transfers the toner image from the intermediate transfer belt 27 to the sheet P. A fixing device 29 fixes the toner image to the sheet P by applying heat and pressure to the toner image and the sheet P. A discharge conveying apparatus 4 conveys the sheet P with the toner image affixed to the outside of the image forming apparatus 120 and discharges the sheet P. In FIG. 1, the sheet P is being conveyed to the image inspection apparatus 110.

The image inspection apparatus 110 is an image reading apparatus that reads the sheet P where the image forming apparatus 120 formed an image and that was discharged from the image forming apparatus 120 and acquires an image for reading (image for inspection). When a sheet sensor 17a detects the leading end of the sheet P, an inlet roller 15 rotates, and the sheet P is drawn in from the image forming apparatus 120 to the image inspection apparatus 110. The inlet roller 15, an upper backing roller 13, a lower backing roller 14, and an outlet roller 16 also rotate, conveying the sheet P. An image reading unit 11a includes an image sensor that reads a first surface of the sheet P and a lighting device. An image reading unit 11b includes an image sensor that reads a second surface of the sheet P and a lighting device. The upper backing roller 13 regulates the passage position of the sheet P by maintaining a distance within a predetermined range between the image reading unit 11a and the sheet P. The lower backing roller 14 regulates the passage position of the sheet P by maintaining a distance within a predetermined range between the image reading unit 11b and the sheet P. When a sheet sensor 17b detects the trailing end of the sheet P, the inlet roller 15, the upper backing roller 13, the lower backing roller 14, and the outlet roller 16 stop rotating. Note that in the present embodiment, a motor M1 that drives a conveyance roller 4a is a motor different from a motor M2 that drives the inlet roller 15. The conveyance roller 4a is a conveyance unit included in the discharge conveying apparatus 4.

In FIG. 1, the post-processing apparatus 130 is connected to the downstream side of the image inspection apparatus 110. A conveying apparatus 30 conveys the sheet P via a plurality of conveyance rollers 31 and switches between conveyance paths for the sheet P via path switching mechanisms 32a and 32b to discharge the sheet P to one of the discharge trays 34a, 34b, and 34c. For example, the sheet P having passed image inspection may be discharged to the discharge tray 34b, and the sheet P having not passed image inspection may be discharged to the discharge tray 34a.

Control Configuration

Figure 2:
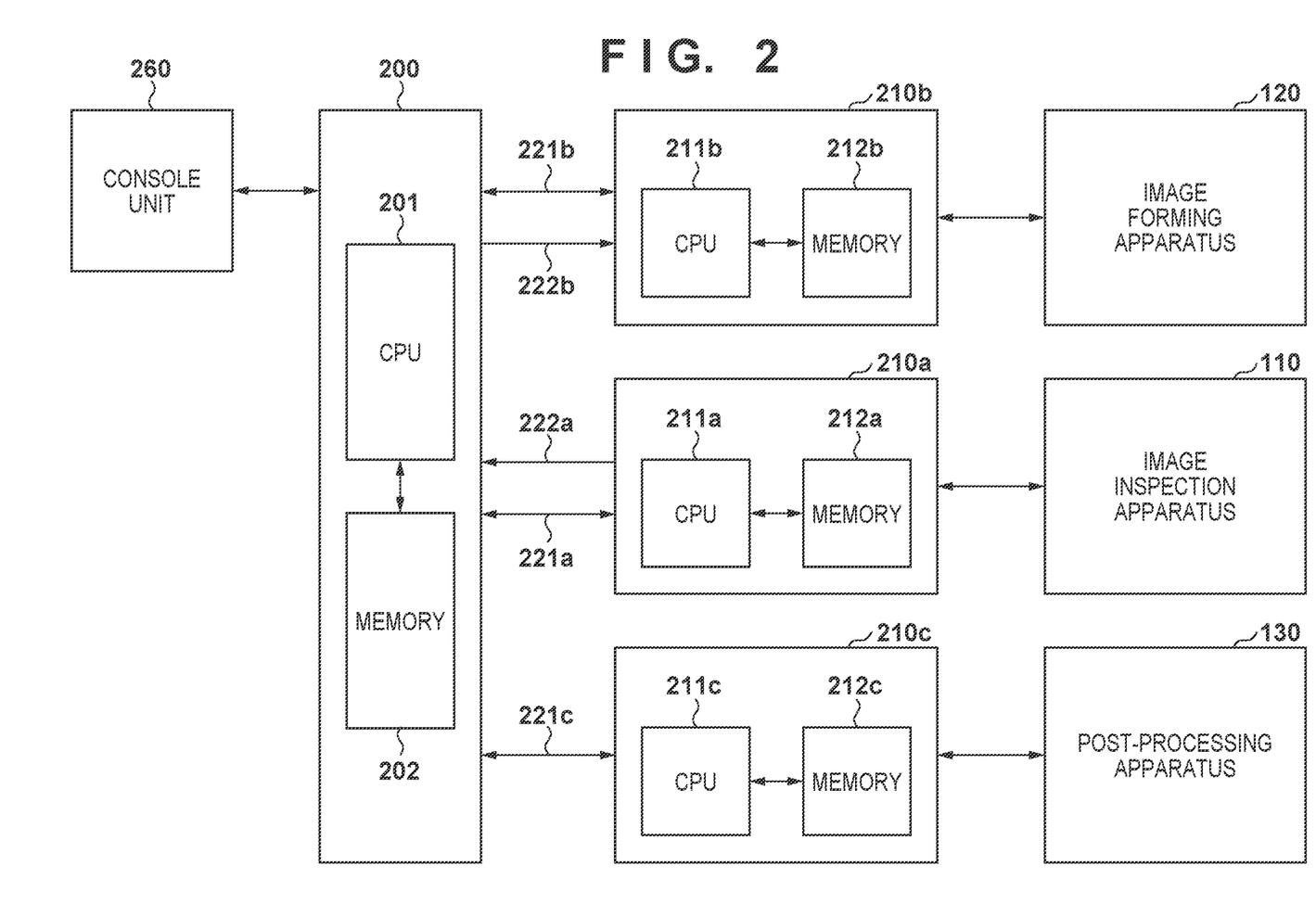
FIG. 2 is a diagram for describing a controller.

FIG. 2 is a diagram for describing the control configuration of the image forming system 100. Note that it is sufficient that the functions described below are implemented by at least one processor.

As illustrated in FIG. 2, the image forming system 100 includes an external controller 200, internal controllers 210a, 210b, and 210c, and a console unit (operation panel) 260. The external controller 200 and the internal controller 210a are connected via a serial communication line 221a and an image communication line 222a. The external controller 200 and the internal controller 210b are connected via a serial communication line 221b and an image communication line 222b. The external controller 200 and the internal controller 210c are connected via a serial communication line 221c.

The external controller 200 is a control circuit that comprehensively controls the entire image forming system 100. A CPU 201 of the external controller 200 implements various functions in accordance with a control program stored in a read-only memory (ROM) area of a memory 202. The memory 202 may include a random-access memory (RAM), a hard disk drive (HDD), a solid state drive (SSD), or the like. The external controller 200 may be provided inside either the image inspection apparatus 110, the image forming apparatus 120, or the post-processing apparatus 130.

For example, the external controller 200 executes a predetermined processing on the image data corresponding to the image (for example, RIP image) received from the apparatus (PC, smart phone, tablet terminal, or the like) located outside of the image forming system 100 and outputs post-predetermined-processing image data to the internal controller 210b via the image communication line 222b.

The internal controller 210b is a controller that controls the image forming apparatus 120. The internal controller 210b may be disposed inside the image forming apparatus 120. A memory 212a may include a ROM, a RAM, a HDD, an SSD, or the like. A CPU 211b controls the feeding apparatus 1, the conveying apparatus 2, the registration apparatus 3, the image forming units 20, the fixing device 29, the discharge conveying apparatus 4, and the like in accordance with a control program stored in the ROM area of a memory 212b on the basis of an instruction from the external controller 200. A CPU 211a controls the image forming apparatus 120 so that an image corresponding to the image data received from the external controller 200 is formed on the sheet P.

The internal controller 210a is a controller that controls the image inspection apparatus 110. The internal controller 210a may be disposed inside the image inspection apparatus 110. The CPU 211a of the internal controller 210a implements various functions in accordance with a control program stored in the ROM area of the memory 212a. For example, the CPU 211a determines the position of the sheet P on the basis of the detection result from the sheet sensors 17a and 17b. Also, the CPU 211a controls the motor M2 to drive the inlet roller 15, the upper backing roller 13, the lower backing roller 14, and the outlet roller 16. Furthermore, the CPU 211a controls the image reading units 11a and 11b to acquire an image for inspection of the sheet P. The memory 212a may include a RAM, a HDD, an SSD, or the like. The CPU 211a transmits the image data of the image for inspection to the external controller 200 via the image communication line 222a. The external controller 200 uses a correction profile described below to correct the image data of the image for inspection received from the CPU 211a. The external controller 200 performs image inspection on the basis of the post-correction image data and the image data of the image (for example, RIP image) received from the apparatus outside of the image forming system 100 as a correct image. The CPU 211a receives a read image command, an inspect image command, and the like from the external controller 200 via the serial communication line 221a.

Note that the image inspection is performed as follows. For example, the inspection matter may be set to "misalignment". The CPU 201 may make a determination of pass in a case in which the misalignment amount between the position of the correct image and the position of the image for inspection is equal to or less than a determination threshold. The CPU 201 may make a determination of fail in a case where the misalignment amount is greater than the determination threshold. Also, the inspection matter may be set to "black dot". The CPU 201 may make a determination of pass in a case in which there are no black dots in the correct image and the size (for example, area) of a black dot in the image for inspection is equal to or less than a determination threshold. The CPU 201 may make a determination of fail in a case in which the size of the black dot is greater than the determination threshold. Note that in the present embodiment, "misalignment" and "black dot" are used as inspection matters, but these are simply examples. In the present embodiment, in a case in which the inspection matter is "misalignment", an inspection of the relative positions between the correct image and the image for inspection is performed. However, this is merely an example. For example, the absolute position relative to an edge of the sheet P of the image for inspection may be inspected. In this case, a determination of pass is made in a case in which the distance between the absolute position of the correct image and the absolute position of the image for inspection is equal to or less than a determination threshold. A determination of fail is made in a case in which the distance is greater than the determination threshold.

The internal controller 210c is a controller that controls the post-processing apparatus 130. The internal controller 210c may be disposed inside the post-processing apparatus 130. A memory 212c may include a ROM, a RAM, a HDD, an SSD, or the like. A CPU 211c controls the conveyance rollers 31 and the path switching mechanisms 32a and 32b in accordance with a control program stored in the ROM area of the memory 212c. The CPU 211c receives a switch command for the path switching mechanisms 32a and 32b and the like from the external controller 200 via the serial communication line 221c.

The communication method between the external controller 200 and the internal controllers 210a, 210b, and 210c used in this example is merely an example. The communication method used may be a controller area network (CAN) method. Also, the external controller 200 and the internal controllers 210a, 210b, and 210c may be connected via a wired connection or by a wireless connection.

The configuration for reading an image on a conveyed sheet includes a first conveyance unit (for example, the inlet roller 15) that conveys the sheet P when an image on the sheet P is being read and a second conveyance unit (conveyance roller 4a) that passes the sheet P to the first conveyance unit. In a case in which the motor (for example, the motor M2) that drives the first conveyance unit is a motor different from the motor (for example, the motor M1) that drives the second conveyance unit, the speed at which the sheet is conveyed during image reading may vary. For example, in a case in which the housing 51 of the image inspection apparatus 110 and the housing 52 of the image forming apparatus 120 are different, the motor that drives the first conveyance unit and the motor that drives the second conveyance unit are different. As a result, when the conveyance speed of the sheet P varies while the image is being read by the image inspection apparatus 110, the image (image for reading) representing the reading result may be elongated or shortened in the direction corresponding to the conveyance direction in which the sheet P is conveyed.

Figure 3:
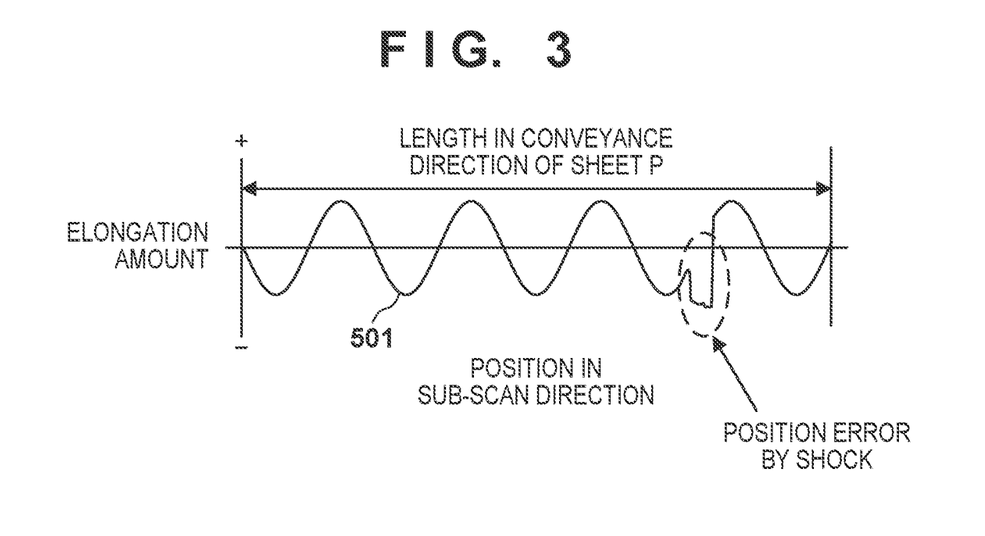
FIG. 3 is a diagram illustrating an example of a profile.

FIG. 3 is a diagram illustrating variation (profile 501) in the image for reading. In FIG. 3, the vertical axis represents the elongation amount of the image. In FIG. 3, the horizontal axis represents the position of the image in the sub-scan direction. Note that "+" on the vertical axis corresponds to elongation of the image in the sub-scan direction, and "−" on the vertical axis corresponds to shortening of the image in the sub-scan direction.

As illustrated in FIG. 3, the image is periodically elongated and shortened in the sub-scan direction according to the position in the sub-scan direction. This is caused by eccentricity in the conveyance roller. Also, as illustrated in FIG. 3, spasmodic elongation and shortening occurs in the image in the sub-scan direction. This is caused by the conveyance speed of the sheet when the sheet is discharged by the image forming apparatus 120 being different from the conveyance speed of the sheet when the sheet is taken in and conveyed by the image inspection apparatus 110. The elongation and shortening of the image is also caused by the shock that occurs when the sheet P is released from the pair of rollers of the image forming apparatus 120 sandwiching the sheet P. Note that the sub-scan direction is the direction corresponding to the conveyance direction in which the sheet is conveyed.

Accordingly, with a configuration in which a sheet is conveyed from the image forming apparatus 120 with a different housing from the image inspection apparatus 110, elongation and shortening of the image for reading may occur. When print quality is inspected on the basis of a comparison between such an image for reading and a correct image (for example, RIP image), the inspection accuracy may be decreased. However, because the present embodiment has the following configuration, a decrease to inspection accuracy can be suppressed.

By inverting the sign of the profile 501 illustrated in FIG. 3, a correction profile may be created, and thus the profile 501 may be used as a correction profile.

Correction Profile Creation

Figure 4:
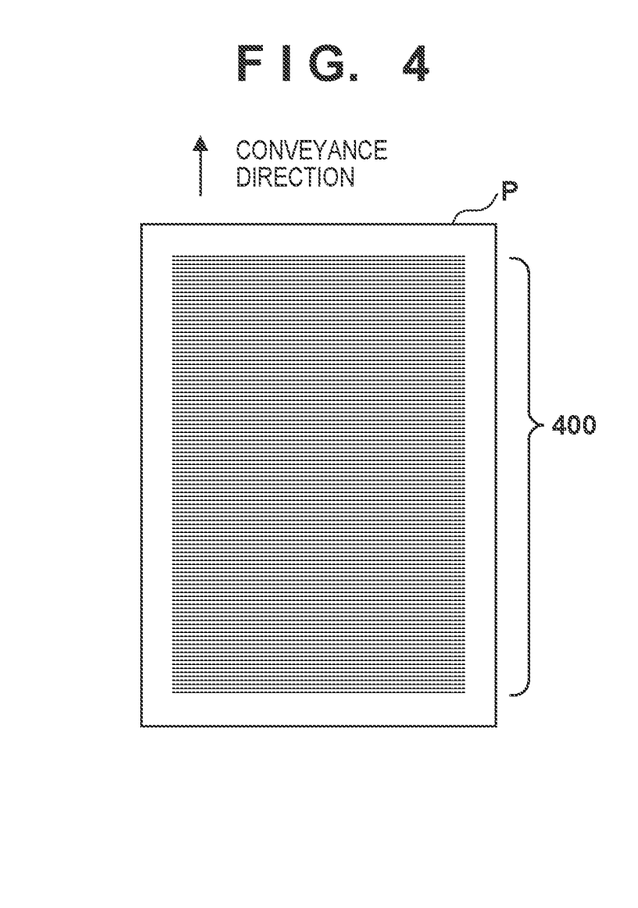
FIG. 4 is a diagram for describing a test image.

FIG. 4 is a diagram illustrating the sheet P (may also be referred to as a test chart or a predetermined image) on which a test image 400 is formed. The test image 400 includes a predetermined reference pattern. The image inspection apparatus 110 reads the image printed on the sheet P and creates an image for reading (image for inspection). The predetermined reference pattern allows the image inspection apparatus 110 to detect distortion in the image for reading (image for inspection). An example of such a reference pattern includes a pattern (parallel line pattern) including a plurality of lateral lines arranged at predetermined intervals.

For example, when the user inputs a predetermined instruction via the console unit 260, the CPU 201 transmits the image data of the test image 400 and a print command to the internal controller 210b. The predetermined instruction is an instruction (instruction for forming a test chart) for creating a correction profile. The image data of the test image 400 may be stored in the ROM area of the memory 202. The CPU 211b generates an image signal corresponding to the image data and outputs the image signal to the exposure device 23. Furthermore, the CPU 211b controls the image forming apparatus 120 and causes the image forming apparatus 120 to form the test image 400 on the sheet P.

Also, when the user inputs a predetermined instruction via the console unit 260, the CPU 201 controls the internal controller 210a and causes the internal controller 210a to read the sheet P on which the test image 400 is formed. The CPU 211a of the internal controller 210a reads the sheet P on which the test image 400 is formed in accordance with the read command transmitted from the CPU 201 and transmits the reading result (image data) to the CPU 201.

The CPU 201 creates the correction profile based on the reading result of the test image 400. For example, the CPU 201 calculates the misalignment amount of the position in the sub-scan direction of the image (image for inspection) representing the reading result of the test image 400 against the test image 400 on the basis of the difference between the reading result of the test image 400 and the original data of the test image 400. The misalignment amount corresponds to the value on the vertical axis illustrated in FIG. 3, for example.

The CPU 201 creates the correction profile to use to reduce the calculated misalignment amount. For example, the CPU 201 associates a value corresponding to the value on the vertical axis illustrated in FIG. 3 with an inverted sign with a position in the sub-scan direction and stores these in the memory 202.

In the case of inspecting a printed image, the CPU 201 uses the correction profile described above and corrects the image data corresponding to the image for inspection and performs inspection on the basis of the post-correction image data and the image data of the correct image.

Figure 5:
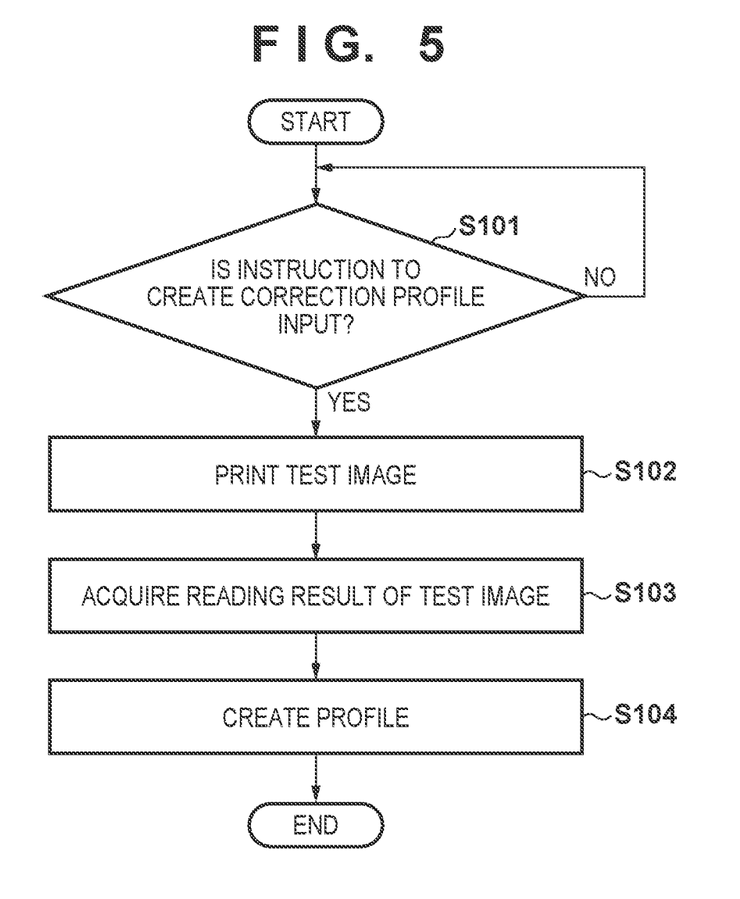
FIG. 5 is a flowchart illustrating a method for creating a correction profile.

FIG. 5 is a flowchart illustrating a method of the external controller 200 of the present embodiment creating a correction profile. The processing of the flowchart illustrated in FIG. 5 is executed by the CPU 201 of the external controller 200.

In step S101, the CPU 201 determines whether or not an instruction to create a correction profile has been input via the console unit 260. When an instruction has been input, the CPU 201 advances the processing to step S102.

In step S102, the CPU 201 prints a test image. For example, the CPU 201 transmits the image data of the test image 400 and a print command therefor to the internal controller 210b. The CPU 211b generates an image signal corresponding to the image data and outputs the image signal to the exposure device 23. Furthermore, the CPU 211b controls the image forming apparatus 120 and causes the image forming apparatus 120 to form the test image 400 on the sheet P. Note that the instruction to create a correction profile may be input via an external apparatus (PC, smart phone, tablet, or the like) of the image forming system 100.

In step S103, the CPU 201 acquires the reading result of the test image. For example, the CPU 201 controls the internal controller 210a and causes the internal controller 210a to read the sheet P on which the test image 400 is formed. The CPU 211a of the internal controller 210a reads the sheet P on which the test image 400 is formed in accordance with the read command transmitted from the CPU 201 and transmits the reading result (image data) to the CPU 201.

In step S104, the CPU 201 creates the correction profile based on the reading result of the test image 400 using the method described above.

The CPU 201 performs image inspection on the basis of the image data corrected using the correction profile and the image data of the correct image.

As described above, in the present embodiment, when an instruction to create a correction profile is input, the test image 400 is formed on the sheet P, and the test image 400 is then read by the image inspection apparatus 110. The CPU 201 creates the correction profile based on the reading result of the test image 400 using the method described above. In the case of image inspection, the external controller 200 corrects the image data acquired from the image inspection apparatus 110 using the correction profile. As a result, elongation and shortening in the image for reading is reduced. The elongation and shortening is caused by the conveyance speed of the sheet P when the sheet P is discharged by the image forming apparatus 120 being different from the conveyance speed of the sheet P when the sheet P is taken in and conveyed by the image inspection apparatus 110. Inspection of the image is performed by comparing the post-correction image data and the image data of the correct image. As a result, a decrease in the print quality inspection accuracy can be suppressed.

The image inspection may be performed by the internal controller 210a. In this case, the CPU 211a receives the image data of the correct image from the external controller 200 via the image communication line 222a. The CPU 211a corrects the image data of the image for inspection using the correction profile described below. Also, the CPU 211a performs image inspection on the basis of the post-correction image data and the image data of the received correct image. In this manner, the image inspection may be performed by the external controller 200 or performed by the internal controller 210a.

In the present embodiment, the image data corresponding to the image for inspection is corrected via the correction profile and inspection is performed on the basis of the post-correction image data and the image data corresponding to the correct image. However, this is merely one example. For example, the image data corresponding to the correct image may be corrected via the correction profile and inspection may be performed on the basis of the post-correction image data and the image data corresponding to the image for inspection.

A configuration in which the configuration of the image inspection apparatus 110 is included in the image forming apparatus 120 (in other words, the image reading units 11a and 11b are provided in the image forming apparatus 120) may be applied to the present embodiment. In other words, the motor M1 that drives the conveyance roller 4a functioning as a conveyance unit included in the discharge conveying apparatus 4 and the motor M2 that drives the inlet roller 15 may be different. In a case in which a plurality of motors are used, elongation and shortening in the image as described above may occur. Thus, by applying the present embodiment, the image data is appropriately corrected and the accuracy of image inspection is improved.

Second Embodiment

The configuration of the image forming system 100 of the second embodiment is similar to the configuration described for the first embodiment. Thus, common components will be omitted from the description.

Figure 6:
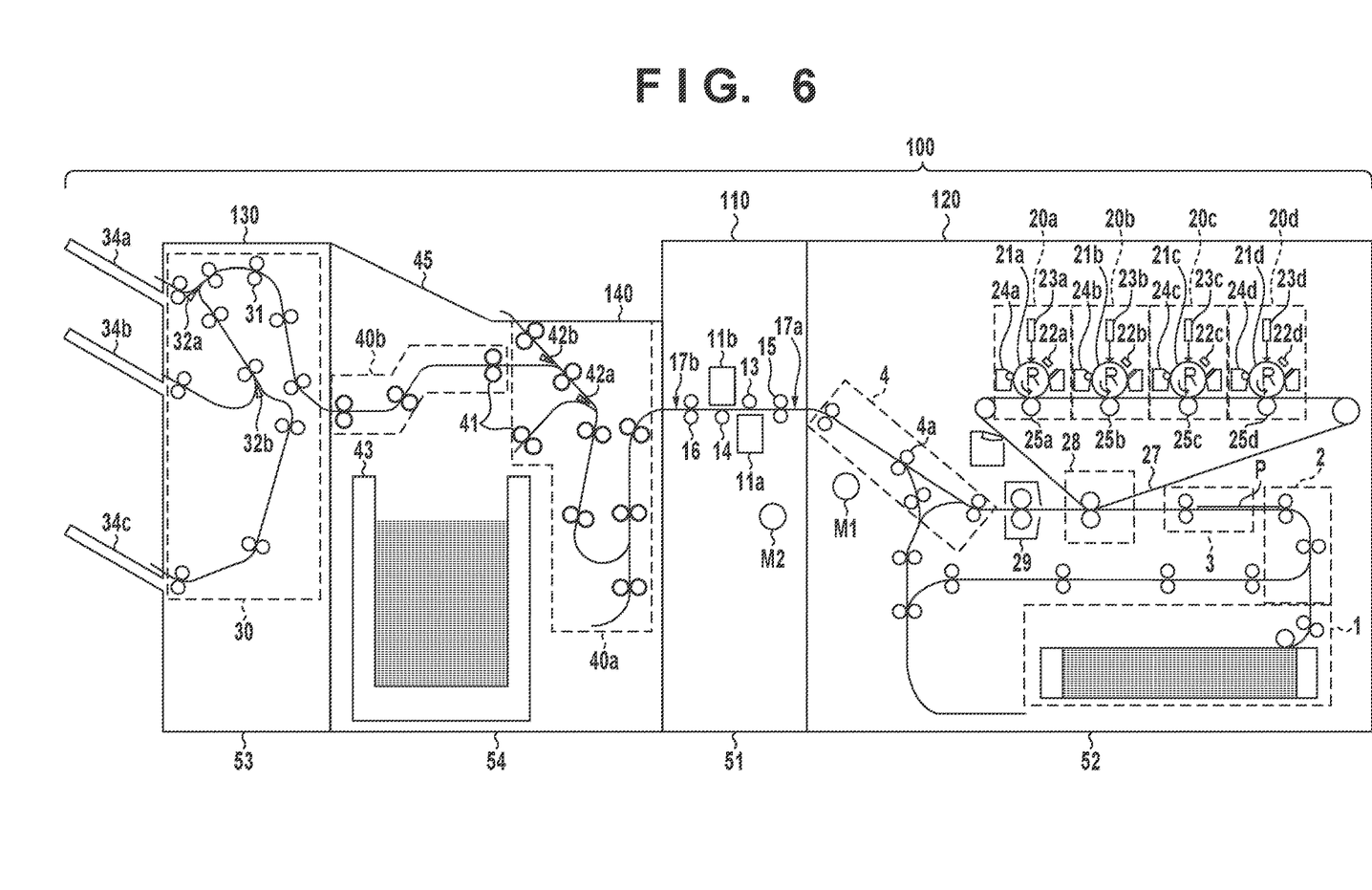
FIG. 6 is a diagram for describing an image inspection system.

In the image forming system 100, for example, an inserter apparatus may be provided between the image inspection apparatus 110 and the image forming apparatus 120. As illustrated in FIG. 6, in the image forming system 100, for example, a large capacity loading apparatus (hereinafter, referred to as a stacker 140) is provided between the image inspection apparatus 110 and the post-processing apparatus 130. The stacker 140 includes a housing 54, conveying units 40a and 40b, an upper tray 45, and a large capacity tray 43. The conveying unit 40a includes a plurality of conveyance rollers 41 and path switching mechanisms 42a and 42b. The path switching mechanism 42a can guide the sheet P to the large capacity tray 43. The path switching mechanism 42b guides the sheet P not guided to the large capacity tray 43 to the upper tray 45 or the conveying unit 40b. The conveying unit 40b guides the sheet P to the post-processing apparatus 130.

For example, the apparatus connected to the upstream side of the image inspection apparatus 110 when an instruction for creating a correction profile is input may be the same as the apparatus connected to the upstream side of the image inspection apparatus 110 when a correction profile was last created. In this case, the degree of elongation and shortening in the image as illustrated in FIG. 3 will not significantly change or the change amount will be small. In such a state, the correction profile last created can be used. Irrespective of this, when an instruction to create a correction profile is input, the test image 400 is formed on the sheet P. In other words, the sheet P may be needlessly consumed (waste paper may be produced). However, when the apparatus on the upstream side or the apparatus on the downstream side of the image inspection apparatus 110 is changed, the tendency in variation illustrated in FIG. 3 changes. Here, with the present embodiment with the configuration described below, the production of waste paper can be suppressed, and a decrease in the print quality inspection accuracy can be suppressed.

Figure 7:
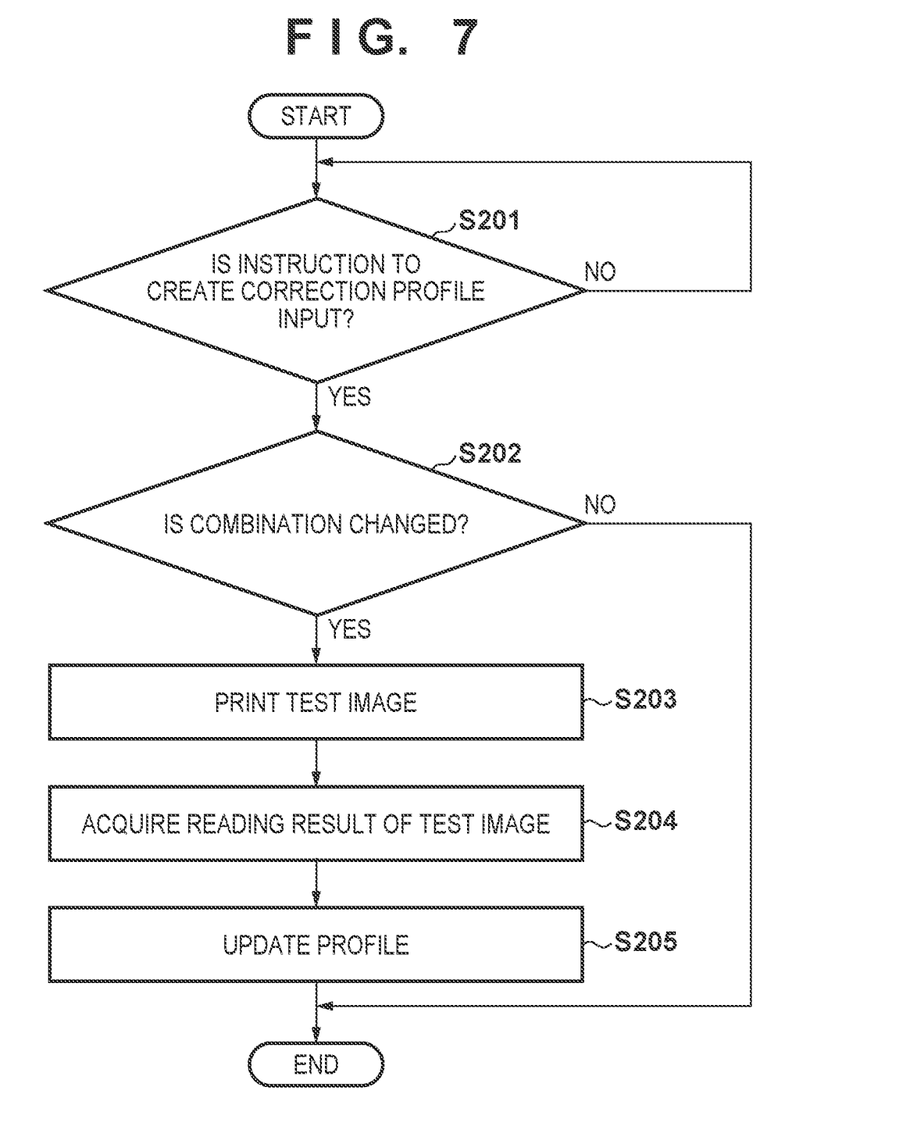
FIG. 7 is a flowchart illustrating a method for creating a correction profile.

FIG. 7 is a flowchart illustrating a method of the external controller 200 of the present embodiment creating a correction profile. The processing of the flowchart illustrated in FIG. 7 is executed by the CPU 201 of the external controller 200.

In step S201, the CPU 201 determines whether or not an instruction to create a correction profile has been input via the console unit 260. When an instruction has been input, the CPU 201 advances the processing to step S202.

In step S202, the CPU 201 detects the combination of apparatuses connected to the image inspection apparatus 110 and determines whether or not the combination has been changed. For example, the CPU 201 may, in order, request identification information or connection position information from the image inspection apparatus 110, the image forming apparatus 120, and the post-processing apparatus 130 via the serial communication lines 221a, 221b, and 221c. Alternatively, by the CPU 201 transmitting a query signal and acquiring identification information in order from the apparatus located upstream in the conveyance direction of the sheet P, which apparatus is connected at which position may be identified. Also, each apparatus may be provided with a sensor that recognizes the apparatus connected to the upstream side and a sensor that recognizes the apparatus connected to the downstream side. The CPU 201 causes each apparatus to report their identification information, the identification information of the apparatus on the upstream side, and the identification information of the apparatus on the downstream side. In this case, the image forming apparatus 120 reports the identification information of the image forming apparatus 120 and the identification information of the image inspection apparatus 110. The image inspection apparatus 110 reports the identification information of the image forming apparatus 120, the identification information of the image inspection apparatus 110, and the identification information of the post-processing apparatus 130. The post-processing apparatus 130 reports the identification information of the post-processing apparatus 130 and the identification information of the image inspection apparatus 110. An apparatus that reports two items of identification information is an apparatus located furthest upstream or an apparatus located furthest downstream in the image forming system 100. An apparatus that reports three items of identification information is an apparatus connected to an apparatus on the upstream side and an apparatus on the downstream side. The CPU 201 identifies the connection position of the apparatuses according to this rule for deciding.

For example, management information indicating the combination of apparatuses detected when the last correction profile was created may be held in the ROM area of the memory 202. By comparing the currently detected combination and the combination stored in the memory 202, the CPU 201 may determine whether or not the combination of apparatuses connected to the image inspection apparatus 110 has changed. In a case in which the combination has changed, the CPU 201 advances the processing to step S203. In a case in which the combination has not changed, the CPU 201 ends the processing of the flowchart. Note that in a case in which the last combination is not stored in the memory 202 or a profile is not stored in the memory 202, the CPU 201 advances the processing to step S203. This is because such cases are analogous to a case in a case in which the combination has changed.

In step S203, the CPU 201 prints the test image 400. For example, the CPU 201 transmits the image data of the test image 400 and a print command therefor to the internal controller 210b. The CPU 211b generates an image signal corresponding to the image data and outputs the image signal to the exposure device 23. Furthermore, the CPU 211b controls the image forming apparatus 120 and causes the image forming apparatus 120 to form the test image 400 on the sheet P. Note that the instruction to create a correction profile may be input via an external apparatus (PC, smart phone, tablet, or the like) of the image forming system 100.

In step S204, the CPU 201 controls the internal controller 210a and causes the internal controller 210a to read the sheet P on which the test image 400 is formed. The CPU 211a of the internal controller 210a reads the sheet P on which the test image 400 is formed in accordance with the read command transmitted from the CPU 201 and transmits the reading result (image data) to the CPU 201.

In step S205, the CPU 201 updates the correction profile or creates a new correction profile using the method described for the first embodiment on the basis of the reading result of the test image 400.

The correction profile may be the profile 501 illustrated in FIG. 3 with the sign inverted. Thus, the profile 501 may be used as a correction profile.

Figure 8A:
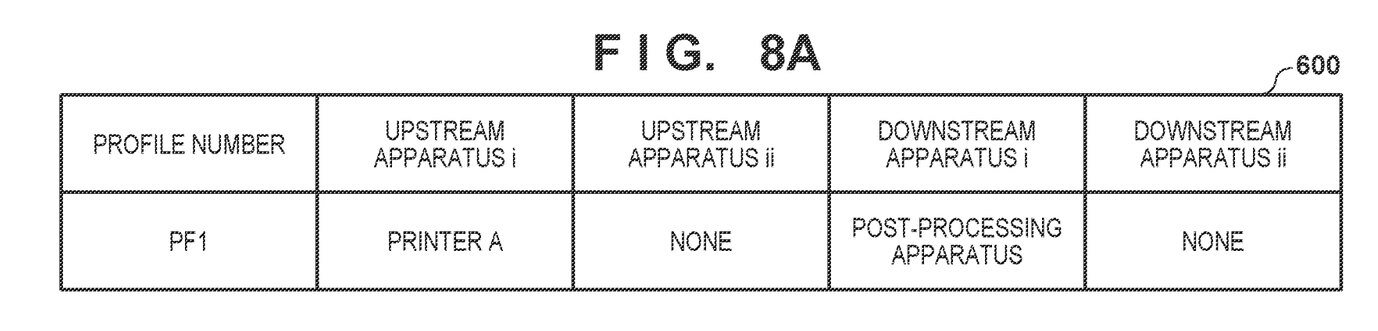
FIGS. 8A and 8B are diagrams for describing management information.

In the present embodiment, the CPU 201 stores the management information for managing the relationship between the profile 501 and the combination of the apparatuses connected to the image inspection apparatus 110 in the memory 202. An example of the management information is illustrated in FIG. 8A. In this example, for an upstream apparatus i, "printer A" representing the identification information of the image forming apparatus 120 is stored. In the present embodiment, because the image inspection apparatus 110 is directly connected to the image forming apparatus 120, nothing is present in an upstream apparatus ii. Also, in a similar manner, nothing is present in a downstream apparatus ii. For a downstream apparatus i, "post-processing apparatus" representing the identification information of the post-processing apparatus 130 is stored. The identification information does not need to be a name/title and may be a combination of numerical values, a combination of numerical values and letters of the alphabet, and the like.

Here, there are advantages in storing management information 600 in the memory 202. For example, even in a case in which the current combination and the last combination are different, there are cases in which the current combination and the combination used previous to last match. In this case, the CPU 201 can skip updating the profile 501. In other words, in a case in which the profile 501 associated with the current combination is already acquired, updating the profile 501 is skipped. Accordingly, the waiting time of the user is shortened.

As described above, the apparatus (current apparatus) connected to the image inspection apparatus 110 when an instruction for creating a correction profile is input may be the same as the apparatus (last apparatus) connected to the image inspection apparatus 110 when the last correction profile was created. In this case, creation of a correction profile is not performed. In other words, the last correction profile created is used in the image inspection. Because creation of the correction profile is skipped, the waiting time for the user is reduced.

However, the current apparatus may be different from the last apparatus. In this case, creation of a correction profile is performed.

As a result, producing waste paper can be suppressed, and a decrease in the print quality inspection accuracy can be suppressed.

In a case in which the current apparatus is the same as the last apparatus, a notification indicating that correction profile creation will not be performed may be displayed on the display panel provided on the console unit 260. This allows the user to come to know that correction profile creation will not be performed. Even when there is an instruction to create a correction profile from the user, in a case in which the test chart is not printed, the user may mistakenly think that the image forming system 100 malfunctioned. In the present embodiment, because the user is notified that correction profile creation will not be performed, the user will not be mistaken.

Examples of Other Combinations

Figure 8B:
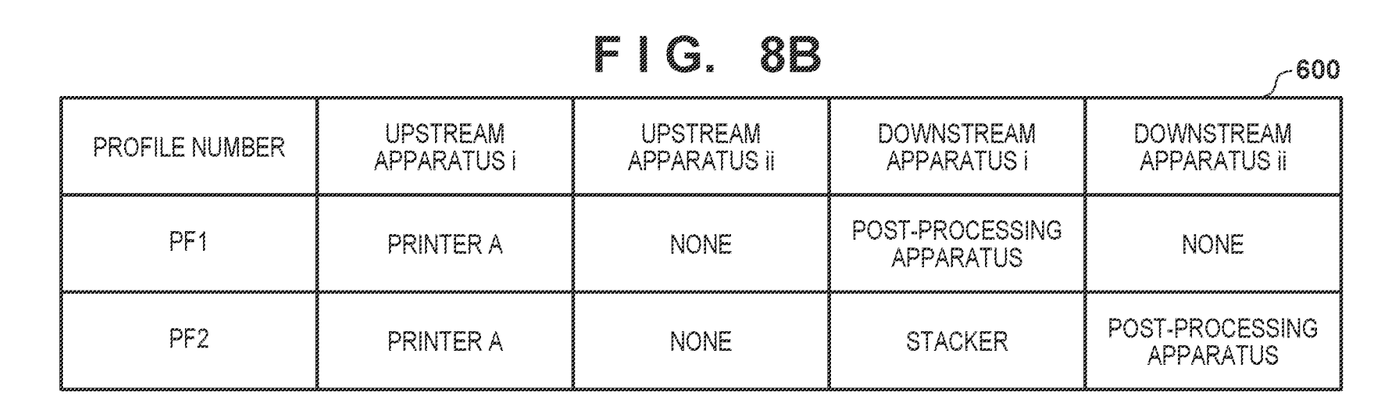

FIG. 8B is an example of the management information 600 with the profile 501 for the combination illustrated in FIG. 6 newly added. A profile number of PF2 is allocated to the profile 501 for the combination illustrated in FIG. 6. This allows for a distinction to be made with a profile number PF1 of the profile 501 for the combination illustrated in FIG. 1. Also, according to FIG. 8B, the identification information of the stacker 140 is listed as the downstream apparatus i, and the identification information of the post-processing apparatus 130 is listed as the downstream apparatus ii.

In this manner, when the combination of the apparatuses connected to the image inspection apparatus 110 is changed, the profile 501 is created or selected according to this combination. Thus, the quality of the printed image can be inspected with greater accuracy in accordance with the combination of the apparatuses connected to the image inspection apparatus 110.

Technical Ideas Derived from Examples

Perspective A1

The image forming system 100 is an example of an image inspection system. The image forming apparatus 120 is an example of an image forming apparatus that forms a printed image corresponding to an original image on a sheet. The image inspection apparatus 110 is an example of an image inspection apparatus that reads the sheet and acquires an image for inspection corresponding to the printed image. The memory 202 is an example of a storage unit that stores in advance correction data for correcting distortion in the image for inspection for the printed image generated at the image inspection apparatus. The CPU 201 is an example of a correction unit that corrects the image for inspection on the basis of the correction data. The CPU 201 is an example of an inspection unit that inspects the print quality of the printed image on the basis of the original image and the image for inspection. The CPU 201 is an example of a detection unit that detects whether or not the sheet conveying apparatus connected to the upstream side or the downstream side of the image inspection apparatus in the sheet conveyance direction has changed. The CPU 201 is an example of an updating unit that updates the correction data when the CPU 201 detects that the sheet conveying apparatus connected to the upstream side or the downstream side of the image inspection apparatus has changed. In this manner, according to the present embodiment, when the sheet conveying apparatus connected to the upstream side or the downstream side of the image inspection apparatus is changed, the correction data is updated. Thus, according to the present embodiment, the waiting time for the user is decreased, and image inspection can be performed with accuracy. In FIG. 2, the CPU 201 is installed in the external controller 200. However, this is not required. The CPU 201 may be installed in the image forming apparatus 120, the image inspection apparatus 110, or the post-processing apparatus 130. In such cases, instead of the description above reading as CPU 201 and memory 202, it would read as CPU 211 and memory 212. Note that the external controller 200 may function as an image inspection apparatus including a storage unit, a correction unit, an inspection unit, a detection unit, and an updating unit.

Perspective A2

The memory 202 may function as a storage unit that stores in advance the identification information of the sheet conveying apparatuses included in the image inspection system. The CPU 201 may function as a collection unit that collects the identification information of the sheet conveying apparatuses included in the image inspection system when a predetermined collection start condition is satisfied. The CPU 201 compares the identification information of the sheet conveying apparatuses stored by the storage unit and the identification information of the sheet conveying apparatuses included in the image inspection system collected by the collection unit. Also, the CPU 201 may detect whether or not the sheet conveying apparatus connected to the upstream side or the downstream side of the image inspection apparatus in the sheet conveyance direction has changed on the basis of the comparison result. This allows for changes to the sheet conveying apparatuses to be reliably detected.

Perspective A3

The memory 202 may function as a storage unit that stores in advance the position information indicating the connection position of the sheet conveying apparatuses included in the image inspection system. The CPU 201 may function as a collection unit that collects the position information indicating the connection position of the sheet conveying apparatuses included in the image inspection system when a predetermined collection start condition is satisfied. The CPU 201 compares the position information of the sheet conveying apparatuses stored by the storage unit and the position information of the sheet conveying apparatuses included in the image inspection system collected by the collection unit. The CPU 201 may detect whether or not the sheet conveying apparatus connected to the upstream side or the downstream side of the image inspection apparatus in the sheet conveyance direction has changed.

Perspective A4

The memory 202 may function as a storage unit that stores in advance the identification information of the sheet conveying apparatus connected to the upstream side of the image inspection apparatus and the identification information of the sheet conveying apparatus connected to the downstream side of the image inspection apparatus. When a predetermined collection start condition is satisfied, the CPU 201 may function as a collection unit that collects the identification information of the sheet conveying apparatus connected to the upstream side of the image inspection apparatus and the identification information of the sheet conveying apparatus connected to the downstream side of the image inspection apparatus. The CPU 201 compares the two combinations. The first combination is a combination of the identification information of the sheet conveying apparatus connected to the upstream side of the image inspection apparatus and the identification information of the sheet conveying apparatus connected to the downstream side of the image inspection apparatus collected by the collection unit and stored by the storage unit. The second combination is a combination of the identification information of the sheet conveying apparatus connected to the upstream side of the image inspection apparatus and the identification information of the sheet conveying apparatus connected to the downstream side of the image inspection apparatus collected by the collection unit. The CPU 201 may detect whether or not the sheet conveying apparatus connected to the upstream side or the downstream side of the image inspection apparatus in the sheet conveyance direction has changed on the basis of the comparison result.

Perspective A5

The console unit 260 may function as an accepting unit that accepts input of information indicating whether or not the combination of the sheet conveying apparatuses included in the image inspection system has changed. The CPU 201 may detect whether or not the sheet conveying apparatus connected to the upstream side or the downstream side of the image inspection apparatus in the sheet conveyance direction has changed on the basis of the information accepted by the accepting unit.

Perspective A6

The predetermined collection start condition may be that the image inspection system is supplied with power from an external power supply and activates. The predetermined collection start condition may be an instruction to start the collection processing for information relating to the sheet conveying apparatuses. The instruction may be input via the console unit 260, for example.

Perspective A7

The CPU 201 causes the image forming apparatus to form a printed image corresponding to the test image on a sheet and causes the image inspection apparatus to read the printed image formed on the sheet. Also, the CPU 201 may update the correction data on the basis of the reading result of the printed image corresponding to the test image and the test image. Accordingly, correction data is created that can reduce the distortion from reading the printed image. The test image may include a plurality of line drawings intersecting the sheet conveyance direction and arranged at even intervals. As illustrated in FIG. 4, the plurality of line drawings may be orthogonal to the sheet conveyance direction. Accordingly, the detection accuracy of elongation or shortening of the image for inspection in the sheet conveyance direction is improved.

Perspective A8

One of the sheet conveying apparatuses connected to the upstream side of the image inspection apparatus may be the image forming apparatus. Also, one or more sheet conveying apparatuses may be connected between the image inspection apparatus and the image forming apparatus.

Perspective A9

The distortion of the image for inspection includes at least one of position misalignment, elongation, or shortening in the image for inspection with respect to the printed image. Distortion in the image for inspection may be caused by a variation in the rotational speed of the rotary bodies involved in conveying a sheet. Such distortion is distortion that may occur when the printed image is read.

Perspective A10

The sheet conveying apparatus connected to the downstream side of the image inspection apparatus may include a sorting function. For example, the discharge tray 34b may function as a first loading unit for loading sheets on which the printed image is formed that has been determined to satisfy the predetermined print quality by the inspection unit. The discharge tray 34a may function as a second loading unit for loading sheets on which the printed image is formed that has been determined to not satisfy the predetermined print quality by the inspection unit.

Perspective A11

The CPU 201 may detect the combination of the sheet conveying apparatuses connected to the upstream side and the downstream side of the image inspection apparatus in the sheet conveyance direction. The CPU 201 may determine whether or not the correction data corresponding to the combination detected by the detection unit is stored in the storage unit. The correction data corresponding to the combination detected by the detection unit may not be stored in the storage unit. In this case, the CPU 201 may function as a creation unit that creates the correction data corresponding to the combination detected by the detection unit. The CPU 201 may associate the correction data with the combination detected by the detection unit and store the correction data in the storage unit. However, correction data corresponding to the combination detected by the detection unit may already be stored in the storage unit. In this case, the CPU 201 may skip creating the correction data.

Perspective B1

The image forming system 100 may include
an image forming unit (for example, the image forming apparatus 120) configured to form an image corresponding to first image data input into the image forming system on a sheet,
a first conveyance unit (for example, the conveyance roller 4a) configured to convey the sheet conveyed from the image forming unit,
a first motor (for example, the motor M1) configured to drive the first conveyance unit,
a second conveyance unit (for example, the inlet roller 15) configured to convey the sheet conveyed from the first conveyance unit,
a second motor (for example, the motor M2) configured to drive the second conveyance unit,
a reading unit (for example, the image reading unit 11a) configured to read an image on the sheet being conveyed by the second conveyance unit, and
a processor (for example, the CPU 201, 211a, 211b, and 211c). The processor may include one or more processors/processor cores/processing circuitries.
The processor may be configured to
generate second image data representing a result of the reading unit reading an image on the sheet;
correct the second image data using correction data, the correction data being data obtained on the basis of image data obtained by the reading unit reading a predetermined image formed on a sheet by the image forming unit and image data corresponding to the predetermined image; and inspect, on the basis of the corrected second image data and the first image data, an image formed on the sheet on the basis of the first image data.

In this manner, the image for inspection may be corrected.

Perspective B2

In the image forming system according to perspective B1, the image forming unit, the first conveyance unit, and the first motor may be provided in a first housing (for example, the housing 52); and the second conveyance unit, the second motor, and the reading unit may be provided in a second housing (for example, the housing 51) different from the first housing.

Perspective B3

In the image forming system according to perspective B1, when the processor receive receives an instruction to create the correction data, the processor may cause the image forming unit to form a predetermined image on a sheet and may cause the reading unit to read an image on a sheet on which the predetermined image is formed.

Also, the processor may create the correction data by comparing image data obtained by the reading unit reading an image on the sheet on which the predetermined image is formed and image data corresponding to the predetermined image.

Perspective B4

In the image forming system according to perspective B1, the image forming unit, the first conveyance unit, and the first motor may be provided in a first housing (for example, the housing 52), and the second conveyance unit, the second motor, and the reading unit may be provided in a second housing (for example, the housing 51) different from the first housing.

The image forming system 100 may further include a storage unit (for example, the memory 202 and 212*a*) that stores the correction data and first information relating to a housing connected to the second housing when correction data is created. The processor may correct the second image data using the correction data stored in the storage unit.

When the processor receives an instruction to create the correction data, the processor may acquire second information relating to a housing connected to the second housing.

In a case in which the first information and the second information are different, the processor may execute creation processing to create the correction data. Here, the creation processing may include (i) the processor causing the image forming unit to form the predetermined image on the sheet and causing the reading unit to read an image on the sheet on which the predetermined image is formed, (ii) the processor creating the correction data by comparing image data obtained by the reading unit reading an image on the sheet on which the predetermined image is formed and image data corresponding to the predetermined image, and (iii) the processor storing the created correction data in the storage unit and storing the second information as the first information in the storage unit.

In a case in which the first information and the second information are identical, the processor may not execute the creation processing.

Perspective B5

The image forming system 100 according to perspective B4 further includes a notification unit (for example, the console unit 260) configured to notify of information indicating that the creation processing has not been executed in a case in which the first information and the second information are identical.

Perspective B6

In the image forming system 100 according to perspective B1, the predetermined image may include a plurality of line drawings intersecting a conveyance direction of the sheet and arranged at even intervals in the conveyance direction of the sheet.

Perspective B7

The image forming system 100 may include an image forming unit configured to form an image corresponding to first image data input into the image forming system on a sheet, a first conveyance unit configured to convey the sheet conveyed from the image forming unit, a first motor configured to drive the first conveyance unit, a second conveyance unit configured to convey the sheet conveyed from the first conveyance unit, a second motor configured to drive the second conveyance unit, a reading unit configured to read an image on the sheet being conveyed by the second conveyance unit, and a processor.

The processor may be configured to generate second image data representing a result of the reading unit reading an image on the sheet;

correct the first image data using correction data, the correction data being data obtained on the basis of image data obtained by the reading unit reading a predetermined image formed on a sheet by the image forming unit and image data corresponding to the predetermined image; and inspect, on the basis of the corrected first image data and the second image data, an image formed on the sheet on the basis of the first image data.

Accordingly, the original image (also referred to as an image for comparison, a correct image, or a reference image) compared to the image for inspection may be corrected.

Perspective B8

In the image forming system 100 according to perspective B7, the image forming unit, the first conveyance unit, and the first motor may be provided in a first housing. The second conveyance unit, the second motor, and the reading unit may be provided in a second housing different from the first housing.

Perspective B9

In the image forming system according to perspective B7, when the processor receives an instruction to create the correction data, the processor may cause the image forming unit to form a predetermined image on a sheet and may cause the reading unit to read an image on a sheet on which the predetermined image is formed.

Also, the processor may create the correction data by comparing image data obtained by the reading unit reading an image on the sheet on which the predetermined image is formed and image data corresponding to the predetermined image.

Perspective B10

In the image forming system 100 according to perspective B7, the image forming unit, the first conveyance unit, and the first motor may be provided in a first housing. The second conveyance unit, the second motor, and the reading unit may be provided in a second housing different from the first housing.

The image forming system 100 may further include a storage unit (for example, the memory 202 and 212a) that stores the correction data and first information relating to a housing connected to the second housing when correction data is created. The processor may correct the first image data using the correction data stored in the storage unit.

When the processor receives an instruction to create the correction data, the processor acquires second information relating to a housing connected to the second housing.

In a case in which the first information and the second information are different, the processor executes creation processing to create the correction data. Here, the creation processing includes the processor causing the image forming unit to form the predetermined image on the sheet and causing the reading unit to read an image on the sheet on which the predetermined image is formed, the processor creating the correction data by comparing image data obtained by the reading unit reading an image on the sheet on which the predetermined image is formed and image data corresponding to the predetermined image, and the processor storing the created correction data in the storage unit and storing the second information as the first information in the storage unit.

In a case in which the first information and the second information are identical, the processor does not execute the creation processing.

Perspective B11

The image forming system 100 according to perspective B10 may further include a notification unit (for example, the console unit 260) configured to notify of information indicating that the creation processing has not been executed in a case in which the first information and the second information are identical.

Perspective B12

In the image forming system 100 according to perspective B7, the predetermined image may include a plurality of line drawings intersecting a conveyance direction of the sheet and arranged at even intervals in the conveyance direction of the sheet.

Perspective B13

The image inspection apparatus 110 includes a conveyance unit configured to convey a sheet conveyed from an image forming unit configured to form an image corresponding to input first image data on the sheet, a reading unit configured to read an image on the sheet being conveyed by the conveyance unit, and a processor (for example, the CPU 211a).

The processor is configured to generate second image data representing a result of the reading unit reading an image on the sheet;

correct the second image data using correction data, the correction data being data obtained on the basis of image data obtained by the reading unit reading a predetermined image formed on a sheet by the image forming unit and image data corresponding to the predetermined image; and inspect, on the basis of the corrected second image data and the first image data, an image formed on the sheet on the basis of the first image data.

Perspective B14

The image inspection apparatus 110 includes a conveyance unit configured to convey a sheet conveyed from an image forming unit configured to form an image corresponding to input first image data on the sheet, a reading unit configured to read an image on the sheet being conveyed by the conveyance unit, and a processor.

The processor is configured to generate second image data representing a result of the reading unit reading an image on the sheet;

correct the first image data using correction data, the correction data being data obtained on the basis of image data obtained by the reading unit reading a predetermined image formed on a sheet by the image forming unit and image data corresponding to the predetermined image; and inspect, on the basis of the corrected first image data and the second image data, an image formed on the sheet on the basis of the first image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-166916, filed Oct. 11, 2021 and Japanese Patent Application No. 2022-129003, filed Aug. 12, 2022, which are hereby incorporated by reference herein in their entirety.

What is claimed is:

1. An image forming system comprising:

an image forming unit configured to form, on a sheet, an image corresponding to first image data input into the image forming system;

a first conveyance unit configured to convey the sheet conveyed from the image forming unit;
a first motor configured to drive the first conveyance unit;
a second conveyance unit configured to convey the sheet conveyed from the first conveyance unit;
a second motor configured to drive the second conveyance unit;
a reading unit configured to read an image on the sheet being conveyed by the second conveyance unit; and
one or more processors configured to:
(1) generate second image data representing a result of the reading unit reading an image on the sheet;
(2) correct the second image data using correction data, the correction data being data obtained on the basis of (a) image data obtained by the reading unit reading a predetermined image formed on the sheet by the image forming unit and (b) image data corresponding to the predetermined image; and
(3) inspect, on the basis of the corrected second image data and the first image data, an image formed on the sheet on the basis of the first image data,
wherein the image forming unit, the first conveyance unit, and the first motor are provided in a first housing,
wherein the second conveyance unit, the second motor, and the reading unit are provided in a second housing different from the first housing,
wherein the image forming system comprises a storage unit configured to store the correction data and first information relating to a housing connected to the second housing when the correction data is created, the one or more processors correcting the second image data using the correction data stored in the storage unit,
wherein when the one or more processors receive an instruction to create the correction data, the one or more processors acquire second information relating to a housing connected to the second housing,
wherein in a case in which the first information and the second information are different, the one or more processors execute creation processing to create the correction data, the creation processing including the one or more processors causing the image forming unit to form the predetermined image on the sheet and causing the reading unit to read an image on the sheet on which the predetermined image is formed, the one or more processors creating the correction data by comparing (a) image data obtained by the reading unit reading an image on the sheet on which the predetermined image is formed and (b) image data corresponding to the predetermined image, and the one or more processors storing the created correction data in the storage unit and storing the second information as the first information in the storage unit, and
wherein in a case in which the first information and the second information are identical, the one or more processors do not execute the creation processing.

2. The image forming system according to claim 1, wherein when the one or more processors receive an instruction to create the correction data, the one or more processors cause the image forming unit to form the predetermined image on the sheet and cause the reading unit to read an image on the sheet on which the predetermined image is formed; and
wherein the one or more processors create the correction data by comparing (a) image data obtained by the reading unit reading an image on the sheet on which the predetermined image is formed and (b) image data corresponding to the predetermined image.

3. The image forming system according to claim 1, further comprising a notification unit configured to provide notification of information indicating that the creation processing has not been executed in a case in which the first information and the second information are identical.

4. The image forming system according to claim 1 wherein the predetermined image includes a plurality of line drawings intersecting a conveyance direction of the sheet and arranged at even intervals in the conveyance direction of the sheet.

5. An image forming system comprising:
an image forming unit configured to form, on a sheet, an image corresponding to first image data input into the image forming system;
a first conveyance unit configured to convey the sheet conveyed from the image forming unit;
a first motor configured to drive the first conveyance unit;
a second conveyance unit configured to convey the sheet conveyed from the first conveyance unit;
a second motor configured to drive the second conveyance unit;
a reading unit configured to read an image on the sheet being conveyed by the second conveyance unit; and
one or more processors configured to:
(1) generate second image data representing a result of the reading unit reading an image on the sheet;
(2) correct the first image data using correction data, the correction data being data obtained on the basis of (a) image data obtained by the reading unit reading a predetermined image formed on the sheet by the image forming unit and (b) image data corresponding to the predetermined image; and
(3) inspect, on the basis of the corrected first image data and the second image data, an image formed on the sheet on the basis of the first image data,
wherein the image forming unit, the first conveyance unit, and the first motor are provided in a first housing,
wherein the second conveyance unit, the second motor, and the reading unit are provided in a second housing different from the first housing,
wherein the image forming system comprises a storage unit configured to store the correction data and first information relating to a housing connected to the second housing when the correction data is created, the one or more processors correcting the first image data using the correction data stored in the storage unit,
wherein when the one or more processors receive an instruction to create the correction data, the one or more processors acquire second information relating to a housing connected to the second housing,
wherein in a case in which the first information and the second information are different, the one or more processors execute creation processing to create the correction data, the creation processing including the one or more processors causing the image forming unit to form the predetermined image on the sheet and causing the reading unit to read an image on the sheet on which the predetermined image is formed, the one or more processors creating the correction data by comparing (a) image data obtained by the reading unit reading an image on the sheet on which the predetermined image is formed and (b) image data corresponding to the predetermined image, and the one or more processors storing the created correction data in the storage unit and storing the second information as the first information in the storage unit, and wherein in a case in which the first information and the second information are identical, the one or more processors do not execute the creation processing.

6. The image forming system according to claim 5, wherein when the one or more processors receive an instruction to create the correction data, the one or more processors cause the image forming unit to form the predetermined image on the sheet and cause the reading unit to read an image on the sheet on which the predetermined image is formed, and wherein the one or more processors create the correction data by comparing (a) image data obtained by the reading unit reading an image on the sheet on which the predetermined image is formed and (b) image data corresponding to the predetermined image.

7. The image forming system according to claim 5, further comprising a notification unit configured to provide notification of information indicating that the creation processing has not been executed in a case in which the first information and the second information are identical.

8. The image forming system according to claim 5, wherein the predetermined image includes a plurality of line drawings intersecting a conveyance direction of the sheet and arranged at even intervals in the conveyance direction of the sheet.

* * * * *